(12) United States Patent
Zeng

(10) Patent No.: US 11,358,515 B2
(45) Date of Patent: *Jun. 14, 2022

(54) VIDEO SYSTEM FOR TRACTOR-TRAILERS

(71) Applicant: ANYTREK CORPORATION, Ontario, CA (US)

(72) Inventor: Haijian Zeng, Ontario, CA (US)

(73) Assignee: ANYTREK CORPORATION, Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,207

(22) Filed: Oct. 26, 2021

(65) Prior Publication Data

US 2022/0041095 A1 Feb. 10, 2022

Related U.S. Application Data

(63) Continuation of application No. 17/096,915, filed on Nov. 12, 2020, now Pat. No. 11,180,071.

(Continued)

(51) Int. Cl.
*B60Q 1/00* (2006.01)
*H04N 5/225* (2006.01)
(Continued)

(52) U.S. Cl.
CPC ......... *B60Q 1/0023* (2013.01); *B60Q 1/0005* (2013.01); *B60Q 1/0088* (2013.01);
(Continued)

(58) Field of Classification Search
CPC .. B60Q 1/0005; B60Q 1/0023; B60Q 1/0088; B60Q 1/30; B60Q 1/44; B60Q 2400/20;
(Continued)

(56) References Cited

U.S. PATENT DOCUMENTS 6,319,039 B1 11/2001 Chambly
7,142,098 B2 11/2006 Lang et al.
(Continued)

FOREIGN PATENT DOCUMENTS

WO 2016028818 2/2016

OTHER PUBLICATIONS

Fujitsu Semiconductor America, Inc, "360° Wrap-Around Video Imaging Technology Ready for Integration with Fujitsu Graphics SoCs", http://tuna.fai.fujitsu.com/Open/webregistration.aspx? fName=gdcg02&DefProductInterest=GENERAL%20GDC, last accessed Nov. 11, 2020. 7 total pages.

(Continued)

*Primary Examiner* — Jason M Han
(74) *Attorney, Agent, or Firm* — SoCal IP Law Group LLP; Angelo J. Gaz; Steven C. Sereboff

(57) ABSTRACT

There are disclosed video systems and methods that use a camera in a lamp housing for a tractor-trailer. Within the housing is an electrical subsystem with a PLC interface and an electrical connector disposed outside the housing and adapted to connect to the trailer and draw power therefrom. A lamp mounted in the housing is connected and adapted to draw power through the electrical subsystem and emit light through a cover of the housing. The camera mounted in the housing has a field of view through the cover. The camera is connected and adapted to draw power through the electrical subsystem and to capture images through the cover and is further connected to the PLC interface. The PLC interface converts data from the camera and transmits the converted data through the electrical connector to the trailer.

19 Claims, 10 Drawing Sheets

Related U.S. Application Data

(60) Provisional application No. 63/021,471, filed on May 7, 2020.

(51) Int. Cl.
```
H04N 7/18      (2006.01)
F21S 45/10     (2018.01)
F21S 43/19     (2018.01)
F21S 43/20     (2018.01)
F21S 43/14     (2018.01)
B60Q 1/30      (2006.01)
B60Q 1/44      (2006.01)
B60R 16/033    (2006.01)
B60R 16/02     (2006.01)
F21Y 115/10    (2016.01)
F21W 103/35    (2018.01)
F21W 103/20    (2018.01)
```

(52) U.S. Cl.
CPC ............... *B60Q 1/30* (2013.01); *B60Q 1/44* (2013.01); *B60R 16/0222* (2013.01); *B60R 16/033* (2013.01); *F21S 43/14* (2018.01); *F21S 43/195* (2018.01); *F21S 43/255* (2018.01); *F21S 43/26* (2018.01); *F21S 45/10* (2018.01); *H04N 5/2253* (2013.01); *H04N 5/2257* (2013.01); *H04N 5/2258* (2013.01); *H04N 5/22521* (2018.08); *H04N 7/183* (2013.01); *B60Q 2400/20* (2013.01); *F21W 2103/20* (2018.01); *F21W 2103/35* (2018.01); *F21Y 2115/10* (2016.08)

(58) Field of Classification Search
CPC .... B60R 16/0222; B60R 16/033; F21S 43/14; F21S 43/195; F21S 43/255; F21S 43/26; F21S 45/10; F21W 2103/20; F21W 2103/35; F21Y 2115/10; H04N 5/22521; H04N 5/2253; H04N 5/2257; H04N 5/2258; H04N 7/183
USPC ........................................................ 362/485
See application file for complete search history.

(56) References Cited

U.S. PATENT DOCUMENTS

| | | | |
|---|---|---|---|
| 10,014,631 | B1 | 7/2018 | Chambly et al. |
| 10,418,757 | B2* | 9/2019 | Kageta .................. B60R 1/00 |
| 2011/0096166 | A1 | 4/2011 | Englander et al. |

OTHER PUBLICATIONS

Amazon.com, 3D Hd 360° Car Surround View Monitoring System, Bird View System, 4 Camera DVR HD 1080P Recorder / Parking Monitoring, https://www.amazon.com/Surround-Monitoring-System-Recorder-Parking/dp/B076X2W2QR, accessed Jul. 24, 2020.

TP-Link AV2000 Powerline Adapter—Gigabit Port, Ethernet Over Power, Plug&Play, Power Saving, MU-MIMO, Noise Filtering(TL-PA9020P KIT), https://www.amazon.com/TP-LINK-Powerline-Pass-Through-TL-PA9020P-KIT/dp/B01H74VKZU/ref=sr_1_4?keywords=wifi+extender+passthrough+p%E2%80%A6, accessed Feb. 17, 2020.

Ebay, Chrysler 300 High Mount Third Brake Light Trunk Mounted with Backup Camera, https://www.ebay.com/itm/Chrysler-300-High-Mount-Third-Brake-Light-Trunk-Mounted-with-Backup-Camera-/233364128199, accessed Jul. 24, 2020.

Navedtra 14050A Construction Mechanic Advanced Part 4, Navedtra 14050A, 200 pages, https://vdocuments.mx/navedtra-14050a-construction-mechanic-advanced-part-4.html, posted Jan. 5, 2017, last accessed Nov. 11, 2020.

Nissan NV200 3rd Brake Light Backup Camera (Birds Eye View), https://www.tadibrothers.com/products/nissan-nv200-third-brake-light-backup-camera-birds-eye-view, accessed Jul. 24, 2020.

Anytrek Corporation, Tail light with a GPS Tracker, https://www.anytrek.com/tracklight, accessed Jul. 24, 2020.

\* cited by examiner

VIDEO SYSTEM FOR TRACTOR-TRAILERS

RELATED APPLICATION INFORMATION

This patent is a continuation of co-pending U.S. patent application Ser. No. 17/096,915, titled VIDEO SYSTEM FOR TRACTOR-TRAILERS, filed Nov. 12, 2020, which claims priority from U.S. provisional patent Application No. 63/021,471 filed May 7, 2020 entitled "SMART TRAILER" all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to video systems for tractor-trailers.

Description of the Related Art

A tractor-trailer is a combination of a semi-truck and a semi-trailer. A semi-truck is sometimes referred to as a tractor, cab, prime mover, tractor, semi-tractor, semi, rig, or big rig, and will be referred to herein as a tractor. A semi-trailer, referred to herein as a trailer, has a chassis which includes wheels and suspension. The tractor and trailer are connected through a mechanical linkage which, while secure, can be released and engaged manually in the field.

A tractor is characteristically a heavy-duty towing engine that provides motive power for hauling a towed or trailered load. Tractors fall into two categories: heavy and medium duty military and commercial rear-wheel drive tractors used for hauling semi-trailers, and very heavy-duty typically off-road-capable, often 6×6, military and commercial tractors, including ballast tractors.

Typically the tractor has a cab which is mounted on a chassis. A driver typically drives the tractor from the cab, and the cab typically has one or more doors, a seat, a steering wheel and other controls for the driver. The term cab as used herein refers to this structure and not the tractor as a whole.

A trailer is called a semi-trailer because it lacks a front axle. A large proportion of a trailer's weight is supported by the tractor, or a detachable front-axle assembly known as a dolly, or the tail of another trailer. The other portion of the trailer's weight is semi-supported (half supported) by its own wheels, which only support the rear of the trailer. Trailers typically have mounted to the chassis a type of cargo carrier such as a box, a curtain sider, a semi dump, an auto-transporter, a flatbed, a refrigerated box, a lowboy, a livestock box, a sidelift, a removable container, a tank or a gullwing. The trailer is typically named after the cargo carrier, such as a box trailer, a curtain sider trailer, etc.

A trailer typically attaches to the tractor with a type of hitch called a fifth-wheel coupling. The fifth-wheel coupling may link the trailer to a leading trailer or a dolly. The coupling consists of a kingpin, which is typically a 2 or 3.5 inch-diameter vertical steel pin protruding from the bottom of the front of the trailer, and a horseshoe-shaped coupling device called a fifth wheel. The fifth wheel is a wide coupling plate bolted onto the chassis of the tractor, leading trailer or dolly, upon which the trailer rests and pivots.

Modern vehicles, including most tractors, have an assortment of different computer modules and other electronic devices which are networked using a controller area network (CAN) bus. Tractors commonly use the CAN bus standard. The CAN bus is typically closed and therefore not open to outside connections. There generally has been little need for communication between a tractor and a trailer.

Apart from the CAN bus, the tractor also has an electrical power system distributed through a wiring harness. This is typically 12 Volts (V). Likewise, trailers have an electrical power system distributed through a wiring harness, also typically 12 V. The tractor provides power to the trailer typically through an SAE J560 seven-terminal connector. The function of the seven leads (and their color) are ground (white), side marker and identification lamps (black), left-hand turn signal and hazard signal (yellow), stop lamps and antilock devices (red), right-hand turn signal and hazard signal (green), tail lights, rear clearance lamp and license plate lamp (brown), and auxiliary, option lamps, dome lamps, etc. (blue). The tractor typically has a plug at the end of a coiled cable known as a Suzie coil or Suzi coil. The trailer typically has a socket rigidly affixed to its chassis. The J560 plug has female receptacles and the J560 socket has male leads. When the trailer is disconnected from or connected to the tractor, an additional step is required to disconnect or connect the wiring harness connector between the tractor and the trailer.

Power delivery from the tractor to the trailer must be highly reliable. Tractors and trailers operate in rugged environments. They are designed to endure very high and low temperatures, very high and low humidity, exposure to chemicals from the environmental, the loads and the vehicles, wear and tear over decades and hundreds of thousands of miles of movement. Through regulation compliance and liability avoidance, the tractor wiring harness and the trailer wiring harness have come to be seen as highly dependable, dedicated to only delivering power, and forbidden from alteration.

More recently video systems have been developed for tractor-trailers. A typical tractor-trailer video system has a display for viewing the video from the tractor and several cameras mounted on the trailer which feed video to the display. There is typically a controller between the display and the cameras. The controller receives video from the cameras, processes the video, and provides processed video to the display. Usually a user interface is provided which allows a user to control aspects of the video system, such as camera selection and zoom.

Tractor-trailer video systems typically require a dedicated wiring harness to power and control the cameras, and send video from the cameras to the display. The harness typically includes a field-serviceable connector between a harness component mounted to the tractor and a complimentary component mounted to the trailer.

To avoid compliance and liability risks, these video systems are typically self-contained. The cameras typically are in discrete housings that are independently mounted on the outside of the trailer. There is no connection to the tractor's CAN bus. There cameras are either solar powered or have batteries. The cameras typically communicate to a display system wirelessly.

Typical tractor-trailer video systems have a lot of problems. Installing a video system harness can take hours, be rife with connection errors and result in significant costs. Additionally, camera installation typically takes a lot of time and results in holes and other physical damage and hazards to the trailer's chassis, body and/or insulation. Physical alteration of the tractor or trailer can void warranties, raise regulatory compliance risks, and lead to considerable maintenance and repair burdens. Because the cameras are mounted onto the trailer, they extend from the trailer and can be damaged by or cause damage to the area around the trailer, especially because the driver may not be accustomed to having these objects extending from the trailer. Unless the tractor and the trailer are owned by the same party, it can be difficult or impossible to obtain permission to install such a system, and when problems arise, it can be difficult to allocate responsibility.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Video systems for tractor-trailers are described that use the tractor' and -trailer's wiring harnesses to transmit digital video data from one or more trailer-mounted camera units to a display unit in the tractor. The camera units may be covertly mounted in the trailer through integration with nondescript trailer lighting. The camera units may have ordinary form factors of various trailer lights and are therefore generally indistinguishable from ordinary trailer lights and readily swapped in the field or added in new construction. The video system uses the wiring harnesses of the trailer and tractor as a broadband digital network for data, including video. As a result, video may be viewed from the tractor without any change or damage to the wiring of the tractor or trailer.

The video system does not require a dedicated wiring harness to control the cameras, power the cameras and/or send data from the cameras to the tractor. The video system also does not require physical alteration of the trailer for mounting cameras. The video system provides a solution that enables trailers to become intelligent; i.e., enables them to provide operational data to the driver and owner, to improve the driver's safety by providing blind spot monitoring and reversing cameras. The video system can be retro-fitted to existing tractors and trailers on the road today, with no more difficulty involved than changing a taillight or side light.

These video systems can be extremely simple to install, and require no extensive installation or time off the road because they only require swapping trailer lights for camera units, setting the display unit into the cab and plugging it into a cigarette lighter outlet. These systems can provide tangible benefits for drivers and owners as they may be less expensive, easier to install, have better fields of view (FOVs), have better display views and avoid more collisions than other systems.

Figure 1:
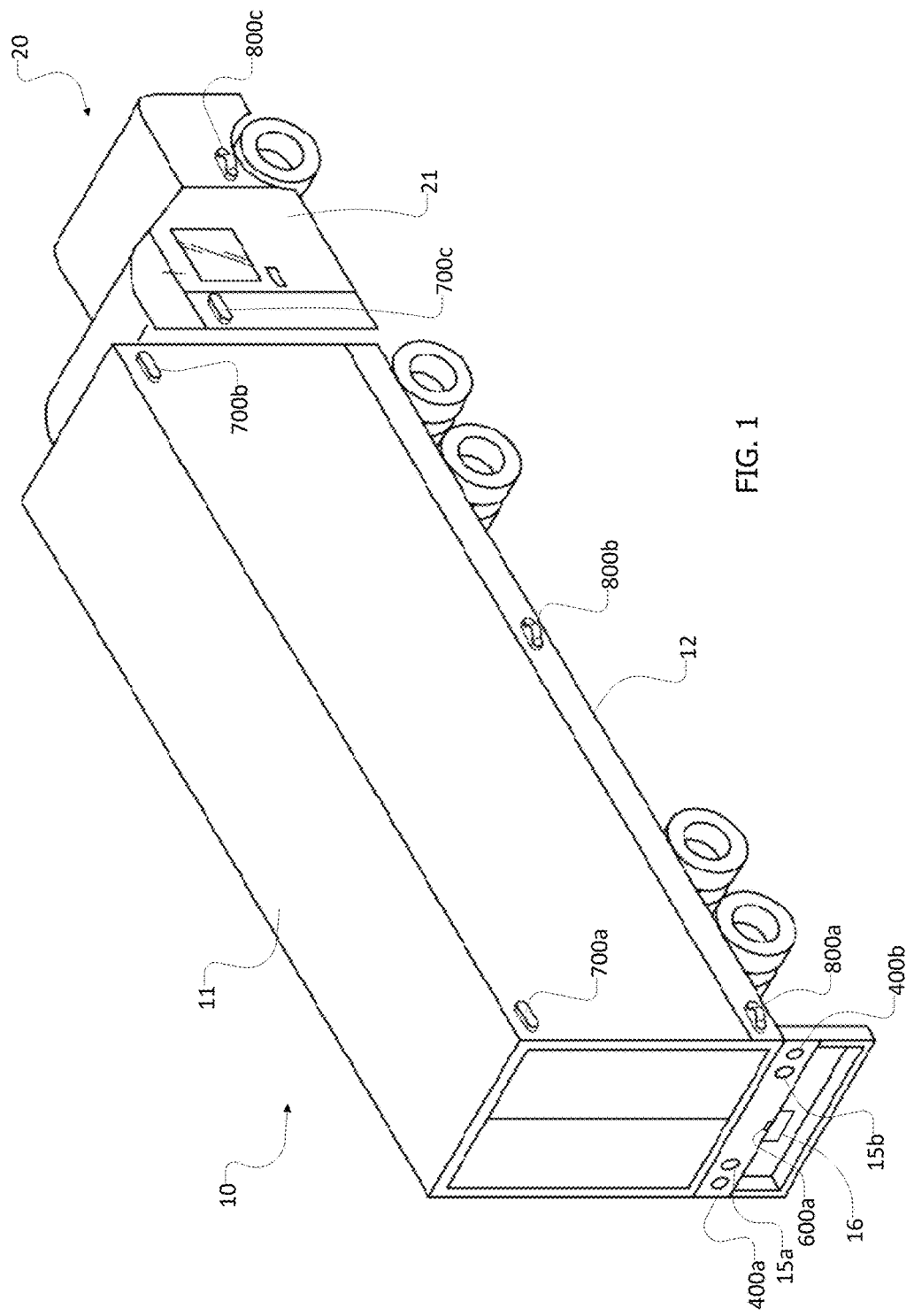
FIG. 1 is a rear perspective view of a video system installed in a tractor and an attached box trailer.

Referring now to FIG. 1 there is shown a rear perspective view of the video system installed in a tractor 20 and an attached box trailer 10. (Because the video system is distributed throughout the tractor 20 and trailer 10, there is no reference number for it.) The trailer 10 includes a cargo container 11 onto a chassis 12. The cargo container 11 may be removably mounted or permanently attached to the chassis 12. The cargo container 11 may be a cargo body, trailer body or shipping container. The tractor 20 has a cab 21 attached to a chassis (not shown).

The video system as shown in FIG. 1 includes a number of camera units mounted around the trailer 10: tail light camera units 400a, 400b and side light camera units 700a, 700b, 800a, 800b. The trailer 10 also has stop lights 15a, 15b which do not have cameras. The rear of the trailer has a license plate 16, above which is mounted a license plate frame camera unit 600a. Tail light camera units 400a, 400b; stop lights 15a, 15b; and license plate frame camera unit 600a may be mounted on the rear end of chassis 12. Side light camera units 700a, 700b, 800a, 800b may be mounted on the cargo container 11. The trailer 10 in this example has respective mounting brackets (now shown) to which the camera units 400a, 400b, 600a, 700a, 700b, 800a, 800b and stop lights 15a, 15b are physically attached. Additional camera units may be mounted on the trailer 10, such as on the hidden side of the trailer 10. The cab 21 may also have side light camera units 700c and/or 800c. The cab 21 may have matching light camera units on the hidden side.

In another case, one camera unit such as 400b can be used in the location of stop light 15b; locations of units 400a, 400b are stop lights instead of camera units; and a stop light is located at 15a. A camera unit at light position 15b provides a good view for the driver since the driver sits on the left side of the vehicle and thus the right side rear at position 15b is the far side view position from the driver.

Besides tractor-trailers, the video system may be used in other vehicles and is well suited to providing video around a towed vehicle and/or the towing vehicle. The video system may be used in non-towed vehicles such as delivery vans, dump trucks and trash trucks. It can be included in all kinds of vehicles including pickup trucks, buses, trains and automobiles.

Figure 2:
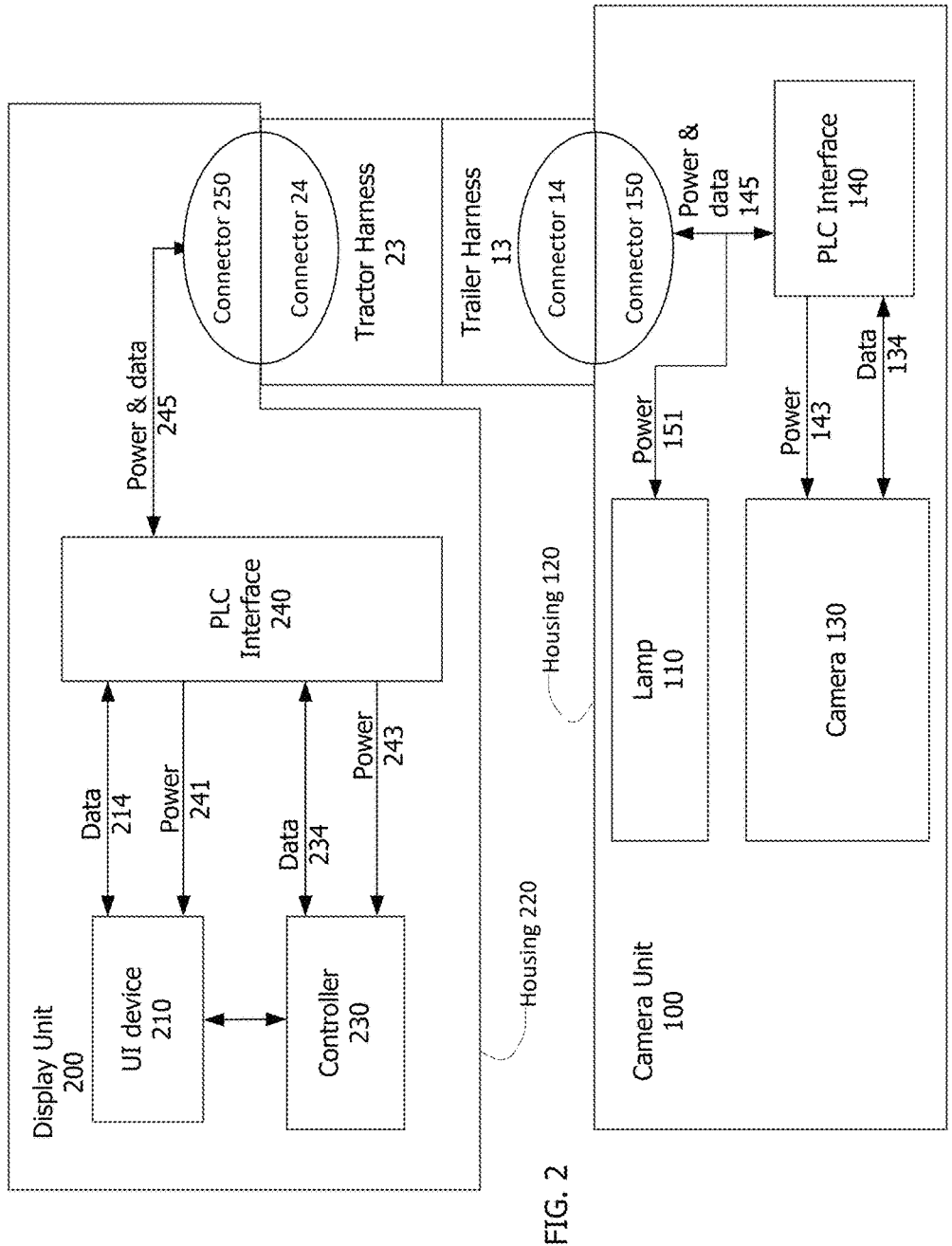
FIG. 2 is a block diagram of the video system.

Referring now to FIG. 2 there is shown a block diagram of the video system. The video system has a display unit 200 and a camera unit 100. The display unit 200 and the camera unit 100 are connected via a tractor wiring harness 23 and a trailer wiring harness 13, neither of which is part of the video system but are used by it. FIG. 2 shows only one camera unit 100, though as shown in FIG. 1 the video system may have a number of such camera units. By providing various views from the camera units, the display unit 200 may help the driver avoid collisions, hazards and other dangerous situations. The video system may provide superior rear and side view information over typical mirrors and cameras.

The tractor wiring harness 23 may be an array of wires and/or wiring loom which reliably distributes power throughout the tractor 20 and to the trailer 10. Power from the tractor 20 to the trailer 10 may be 12 volts with current between 0.48 and 2.1 amperes. The harness 23 has a power connector, such as an SAE J560, disposed at the rear of the tractor behind the cab.

The trailer wiring harness 13 is adapted to power lights and other components as needed for proper functionality of the trailer 10, for example 12 volts between 0.48 and 2.1 amperes. The trailer wiring harness 13 includes a wiring loom having wires for carrying power from the tractor wiring harness 23 to various side lights, taillights and other lights of the trailer 10. The harness 13 has electrical power supply connectors 14 for removably connecting the harness 13 to the electrical power connectors 150 of the side lights and the taillights. The harness 13 also has a power connector disposed at the front of the trailer, such as an SAE J560, for connecting the trailer wiring harness 13 to the tractor wiring harness 23.

The video system may use a PLC technology for sending the video data from the camera unit 100 to the display unit 200 through the wiring harnesses 13, 23 that is also used simultaneously for DC power transmission distribution within the tractor-trailer. Thus, the video system uses the wiring harnesses 13, 23 as data buses and may use protocols such as SAE J1939 and J1 1992—Control Area Network (CAN), SAE J2497—Powerline communication (PLC), and SAE J1208/1587.

The display unit 200 is mounted in the cab 21 and connected to the tractor wiring harness 23. The display unit 200 includes a housing 220 in which is mounted a controller 230, a PLC interface 240 and an electrical connector 250. The controller 230, the PLC interface 240 and the connector 250 form an electrical subsystem along with their respective electrical interconnects.

The display unit 200 may include a user interface device 210. The user interface device 210 may be a flat panel touch screen and provides visual information and video to the driver and/or other users, and receives user input. The user interface device 210 may include soft (e.g., display touch) buttons and hard buttons. The user interface device 210 may allow the user to power on, activate and monitor the camera unit 100. There may be more than one user interface device. The user interface device 210 may be a tablet computer which is mounted in the housing 220, mounted elsewhere, or unmounted. The user interface device 210 may be an iPad, mobile phone or an aftermarket navigation system.

The PLC interface 240 is a splitter which splits power and data 245 from the electrical connector 250 into a power connection 241 and 243 to the user interface device 210 and the controller 230, respectively; and a data connection 234 with the controller 230. The PLC interface 240 may include a demodulator to demodulate into data the signals sent from the camera unit 100 through the trailer harness 13 and then the tractor harness 23. The PLC interface 240 may include a protocol or modulation linking unit having circuitry, hardware and/or software for communication initialization or other handshakes with other PLC interfaces. The PLC interface 240 may be an AR7420 from Qualcomm, which is a MAC/PHY transceiver designed to bridge a powerline network to Ethernet 802.3. Thus, the UI device 210 and the controller 230 may use Ethernet to communicate with the PLC interface 240. That is, the PLC interface 240 is a virtual Ethernet cable to the UI device 210 and the controller 230. Although FIG. 2 shows the PLC interface 240 powering the user interface device 210 and the controller 230, the user interface device 210 and/or the controller 230 may instead draw power from the connector 250 or from a separate power lead. As shown, the PLC interface 240, the UI device 210 and the controller 230 have corresponding data connections. The specific flow of data between them may follow various paths, including direct or indirect.

The electrical connector 250 removably mates to a complimentary electrical connector 24 in the tractor wiring harness 23. The connector 250 may be an ANSI/SAE J563 connector, and the connector 24 may be a cigarette lighter socket. The connector 250 may be integrated into the housing 220 or to a lead and is electrically connected to the PLC interface 240.

The controller 230 is a programmed computing device which interfaces and controls the user interface device 210 and the PLC interface 240. The controller 230 may include a memory (not shown) for storing various data. The display unit 200 may also include a network interface to the controller 230 to support Internet connectivity, video transmission, web browsing and remote control. The network interface may be a cellular modem. The controller 230 may support stitching or splicing multiple video streams, such as from camera units disposed around the trailer 10.

The controller 230 may use artificial intelligence (AI) to detect dangers to the driver and/or tractor-trailer based on the video data from the camera units. The controller 230 may receive additional data, such as brake usage, and generate controls, such brake engagement. The controller 230 may send an alert (e.g., displayed and/or audio output through the user interface device 210) for notifying the driver of the danger and/or to avoid a collision. The AI may identify potential collisions and send the warning in time for the collision to be avoided by the driver or for automated collision avoidance.

The camera unit 100 is mounted on the trailer 10 and connected to a trailer wiring harness 13. The camera unit 100 includes a cuplike housing 120 defining a cavity in which is mounted a camera 130, a PLC interface 140, an electrical connector 150 and a lamp 110. The lamp 110, camera 130, PLC interface 140, connector 150 form an electrical subsystem along with their respective electrical interconnects.

The camera 130 may be mounted onto one or more surfaces or components in the cavity of the housing 120. The camera 130 has a field of view (FOV). The camera 130 generates a digital video stream. The video may be high resolution and/or high frame rate. The FOV may have a cone shape from the point of the camera's image sensor (not shown), with an angle of between 10 and 120 degrees and a range of 50 to 1000 feet. The camera may sense visible light or may be tuned to other spectra, such infrared or ultraviolet bands.

The camera 130 is connected and adapted to draw power from the PLC interface 140 via power connection 143. Through integration with the lamp 110 in the housing 120, the camera 130 is covert because the camera unit 130 appears to be only a light on the trailer 10. The camera 130 may generate video and still images that are sent as data to the PLC interface 140 using data connection 134. The camera 130 may include a microphone for receiving audio which the camera 130 sends as data. The camera may be small enough in size and located in the housing 120 such that the lamp's light output in lumens and color meets regulatory requirements (e.g., departments of transportation), while also preventing light from the lamp 110 interfering with the camera 130 capturing useful images. The camera 130 may have an integrated controller and communications interface, such as an Ethernet interface, and communicate with the PLC interface 140 via Ethernet.

The camera unit 100 may have multiple cameras, but only one is described with respect to FIG. 2. Additional cameras may be the same as the camera 130. The cameras may share the power connection 143 and have separate data connections 134. Data from the cameras may be multiplexed within the camera unit 100, or each camera may provide a separate data feed (e.g., their own video stream) to the display unit 200.

The PLC interface 140 may be the same as or similar to the PLC interface 240 and provides similar functionality within the camera unit 100. In the camera unit 100, the PLC interface 140 overlays data from the camera 130 on the power in the trailer wiring harness 13, and provides power to the camera 130. The PLC interface 140 may include a modulator to transmit data from the camera 130 into the trailer wiring harness 13 by adding the data from the camera 130 onto a modulated carrier signal. The PLC interface 140 may further include a transmitter for transmitting the modulated carrier signal with video data to the electrical power connector 150 for transmission onto a power wire of the trailer wiring harness 13. The modulator may use orthogonal frequency-division multiplexing (OFDM), such as to ensure that data from multiple camera units can be sent on the same power wire of harness 13 and 23. The PLC interface 140 is connected to the connector 150 by power and data connection 145.

The PLC interface 140 provides power to the camera 130, though the camera 130 may instead draw power from the connector 150. The PLC interface 140 may also provide power to the lamp 110, for example in a version of the camera unit 100 where the lamp 110 is digitally controlled.

The connector 150 may be integrated into the housing 120 or attached to the housing 120 by a connector cable. The connector 150 is connected to receive electrical power from the connector 14. The connector 14 electrically connects connector 150 to electrical power in the trailer wiring harness 13. The connectors 150 and 14 may be 3-prong plugs with leads for positive voltage (e.g., +12 volts), negative voltage (e.g., 0 volts) and ground. The connector 150 may be male and the connector 14 female.

The lamp 110 is mounted in the housing 120 and connected to the connector 150 by power connection 151. The lamp 110 may be one or more light sources which, under control of the tractor 20, serve as one of the following types of lighting for the trailer 10: side marker, identification, left-hand turn signal, hazard signal, brake indicator, antilock indicator, right-hand turn signal, tail marker, rear clearance marker, license plate illumination, auxiliary illumination or auxiliary signal. The lamp 110 is adapted to draw power through the electrical subsystem of the camera unit 100 and when powered to emit light. In typical use, some lamps will be always-on (e.g., markers) and others lit only intermittently (e.g., signals). If a light serves as both an indicator and a marker (e.g., a brake light which is always on as a marker but becomes brighter to indicate braking), the light may be considered always-on. The lamp 110 may be colored or white, with or without a color filter, to provide a color corresponding to the intended function of the lamp.

The color of lights on a trailer may be regulated. With some regional exceptions, lamps facing rearward must emit red light, lamps facing sideward and all turn signals must emit amber light, while lamps facing frontward must emit white or selective yellow light. That is, red for tail lights, stop lights, brake lights, rear side markers, rear clearance, rear identification, hazard; amber for front side markers, intermediate side markers; red or amber for rear turn signals; white for license plate illumination, rear upper body markers. Some lamps may flash under control of the tractor by turning the power to the lamp on and off. The lamps may be, for example, incandescent, florescent or light emitting diode (LED). The visible shape of the lamp when installed may be oval, round, or otherwise, though the surface area or light output may be regulated.

Because the camera unit 100 is powered from power lines intended for lamps in the trailer 10, if the lamp type is always-on then the camera unit is ensured consistent power. If the lamp type is intermittent then the camera unit 100 also will be powered only intermittently unless the camera unit 100 includes another power source (e.g., solar panel). However, the need for another power source may prevent the camera unit 100 from being covert and/or easily installed, thereby impairing advantages of the video system.

The camera unit 100 may include a rechargeable battery (not shown) mounted in the housing 120 which powers the camera 130 but not the lamp 110. The battery may also provide power to the PLC interface 140, enabling the PLC interface to transmit data to the trailer 10 even when there is no DC current flowing (i.e., 0 V). Power from the trailer 10 and supplied to the camera unit 100 charges the battery. The battery may be a lithium-ion rechargeable battery.

A power management module (not shown) may monitor the power levels from the trailer 10 and the voltage level of the battery to manage recharging of the battery. The battery may receive a measured charging current whenever the power management module is actively receiving power from the trailer 10.

The camera unit may include a cellular modem for transmitting data, such as images from the camera, to a remote server.

Identification of each camera, camera unit and trailer is useful. Thus, the camera 130, camera unit 100 and/or the trailer 10 may have unique identifiers stored within or associated with them. The camera 130 and/or the camera unit 100 may store an identifier that alone or with identifiers from other cameras or camera units in the trailer 10 serve as unique identifier of the trailer 10. The unique identifier may be an Internet Protocol (IP) address and/or MAC address. The unique identifier may be stored in the PLC interface 140. Unique identification of cameras and camera units allows selective control of them, which is useful when the trailer has multiple camera units and the camera unit has multiple cameras. In some cases, the PLC interface is a MAC/PHY transceiver and the camera stores its own unique identification number for the system.

With the trailer 10 connected to the tractor 20, the unique identifier of the trailer 10 can be obtained. The unique identifier shows which trailer has been connected to the tractor 20, and can be useful to ensure that the tractor 20 has been attached to the correct trailer, and vice versa. Trailer identification information may be provided by the display unit 200 to the driver, to other people, or to automated systems in the tractor 20 or external to the tractor 20 (e.g., a fleet operations center).

Figure 3:
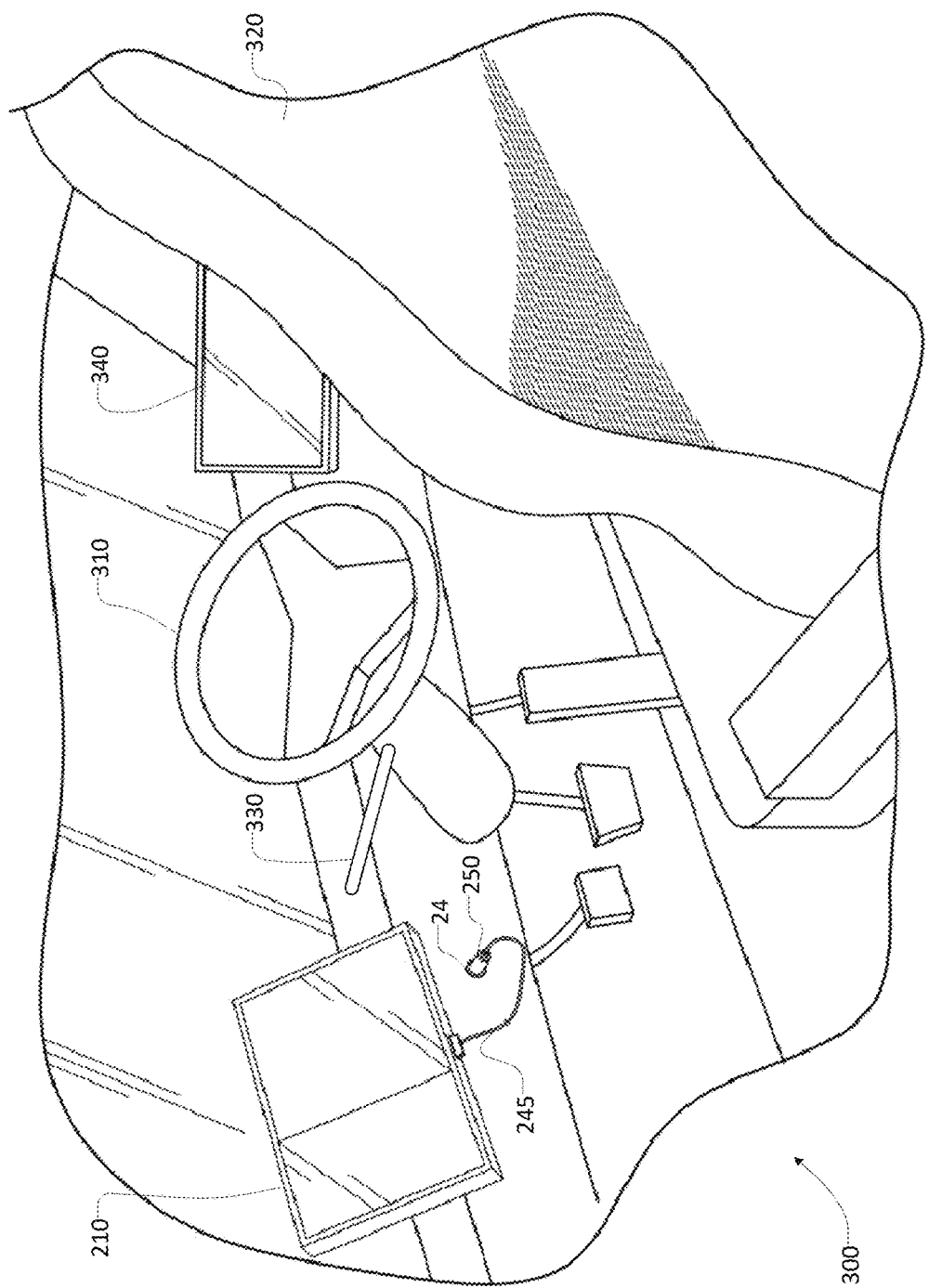
FIG. 3 is a partial perspective view of a display of the video system mounted in a tractor.

Referring now to FIG. 3 there is shown a partial perspective view of an interior 300 of the cab 21. The cab 21 may have a steering wheel 310, a turn signal level 330, a driver's seat 320 and other typical components. Various marker and signal lights may be controlled by the driver from the cab 21. A user's operation of the turn signal lever 330 causes the tractor to power leads in the connector 250 to power turn signal lights in the trailer 10.

The user interface device 210 is shown mounted in the cab 21 so that the user interface device 210 remains visible to the driver and stable during use of both the tractor (e.g., driving) and the user interface device 210 (e.g., touching the touchscreen). A cable 245 from the user interface device 210 terminates in the connector 250 which is shown partially inserted into the cigarette lighter outlet 24. The user interface device 210 has a housing which may be the housing 220 of the display unit 200, also holding the PLC interface 240 and interconnects.

Figure 4:
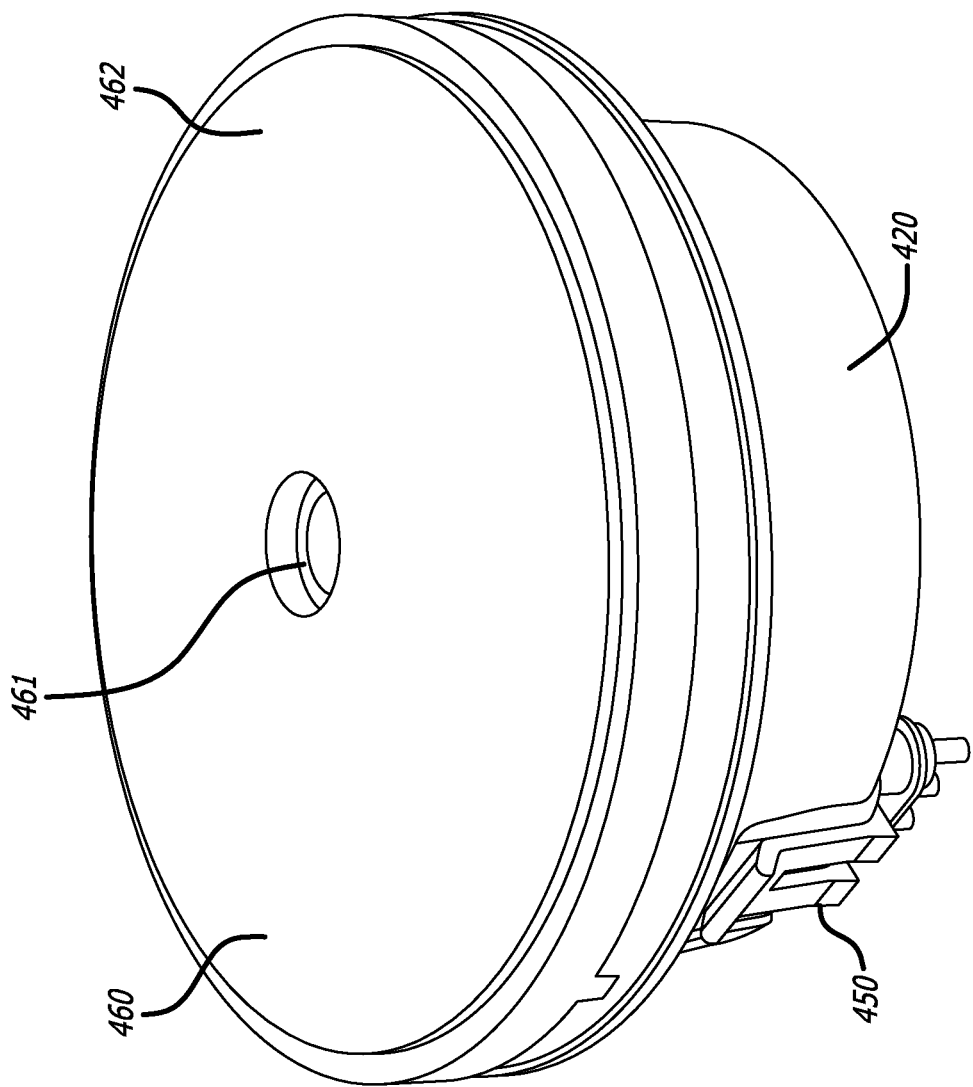
FIG. 4 is an isometric perspective view of a tail light camera unit.

Referring now to FIG. 4 there is shown an isometric perspective view of a tail light camera unit 400 which may be the camera unit 100 having the same components. (For ease of reference, elements in FIG. 4 are assigned reference numbers in the 400s with the tens and ones digits the same as the corresponding elements in FIG. 2). The tail light camera unit 400 is a round tail marker light with the camera (not shown) covertly integrated.

The housing 420 may have a 4" or 6" round cross-section. The housing 420 may be formed of one or more solid, opaque, white colored polycarbonate parts. The housing 420 has an exterior which includes a mounting bracket (not shown) which may be formed of metal or polycarbonate and adapted to mate into a complimentary receptacle or mounting bracket on the trailer 10. The housing 420 has an interior in which the lamp, camera and PLC interface are mounted. The interior mounting may be vibration-resistant.

Attached to the front of the housing 420 is a cover 460. The cover 460 may be field removable to allow service of the insides of the camera unit 400. The cover 460 may be waterproof-sealed to the housing 420. The cover has a clear portion 461 and a translucent portion 462. The translucent portion 462 is either red or clear. In another case, the light is red LEDs and the lens is a red translucent lens. The translucent portion 462 is red to filter white light from the camera unit's lamp (not shown), or clear if the light from the lamp is red (e.g., red LEDs). The clear portion 461 may be or include a lens, which may be wide angle or fisheye. The clear portion 461 may have optical qualities or may be optically inert, and may provide protection from damage to the camera 130. The camera may have lens disposed below the clear portion 461.

The clear portion 461 is significantly smaller than the translucent portion 462. Both the clear portion 461 and the translucent portion 462 have a respective surface area. The surface area of the clear portion 461 is less than ten percent of a surface area of the translucent portion 462. The lens/lamp cover 462 may be a 4" diameter round lens and the camera cover 461 may be a ¾" diameter round cover. The camera cover may be small in other cases.

Figure 5:
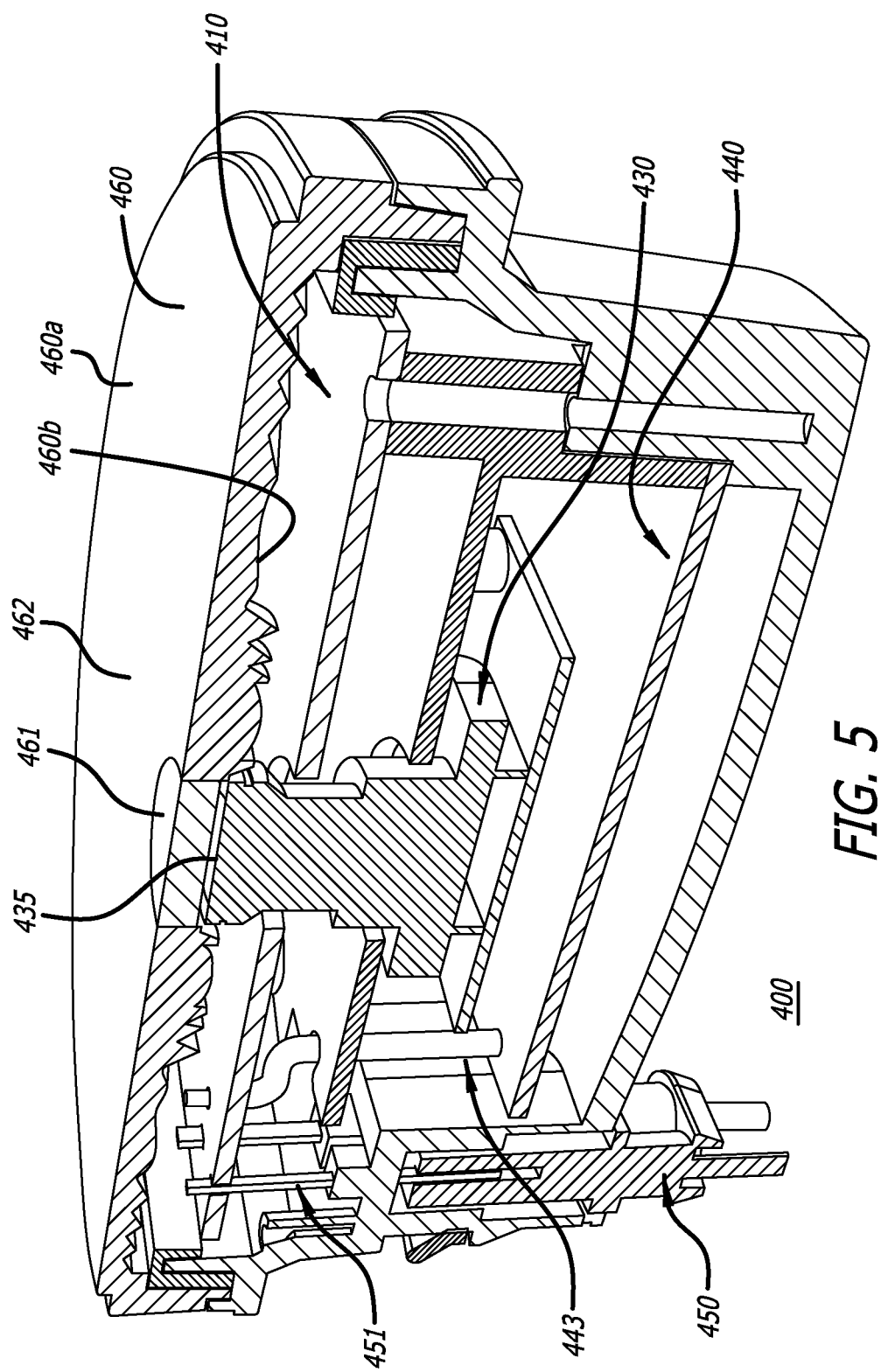
FIG. 5 is a cut-away side view of the tail light camera unit.

Referring now to FIG. 5 there is shown a cut-away side view of the tail light camera unit 400. The cover 460 may have an outside-facing surface 460a which is substantially smooth and an inside-facing surface 460b which may have a pattern of raised, jagged elements which guide and disperse the light. It may be a Fresnel lens.

The camera 430 is positioned such that its image sensor 435 is positioned behind the clear portion 461 to provide a field of view outward from the housing 420. The clear portion 461 may be a clear spot in the cover 460. The clear portion 461 may protrude above, be flush with, or be below the front surface 460a.

The clear portion 461 and the image sensor 435 may be vertically positioned and have respective surface areas with respect to the vertical positions and surface area of the translucent portion 462, the outside-facing surface 460a, the inside-facing surface 460b and the (optional) pattern of raised, jagged elements such that the images or video obtained by the sensor is shielded from the light output by the lamp 410. The camera or sensor 435 may stick out of the outside-facing surface 460a in order to avoid light contamination. The camera or sensor may stick out ⅛ to ½ inches. In other cases, the camera or sensor may be encircled by a colored plastic collar to avoid light contamination. While the light output by unit 400 in lumens and color meets regulatory requirements (e.g., departments of transportation), the vertical positions and areas preventing light from the lamp 410 interfering with the image sensor 435 capturing useful images. The camera 430 may have a physical filter, lite pipe filter or film (not shown) over the image sensor 435 and below the clear portion 461 that filters out any color or illumination from the lamp 410 that interferes with or prohibits the image sensor 435 from capturing useful images. The camera 430 may have an analog or digital image processing filter that filters out color or illumination from the lamp 410 captured by the sensor 435 so that the color or illumination does not interfere with or prohibit the image sensor 435 from capturing useful images. The camera unit 400 may use a combination of the vertical positions, surface area and/or filters to ensure useful images from the image sensor 435 are captured and sent to the PLC interface 140 despite the lamp 410 being illuminated.

Figure 6:
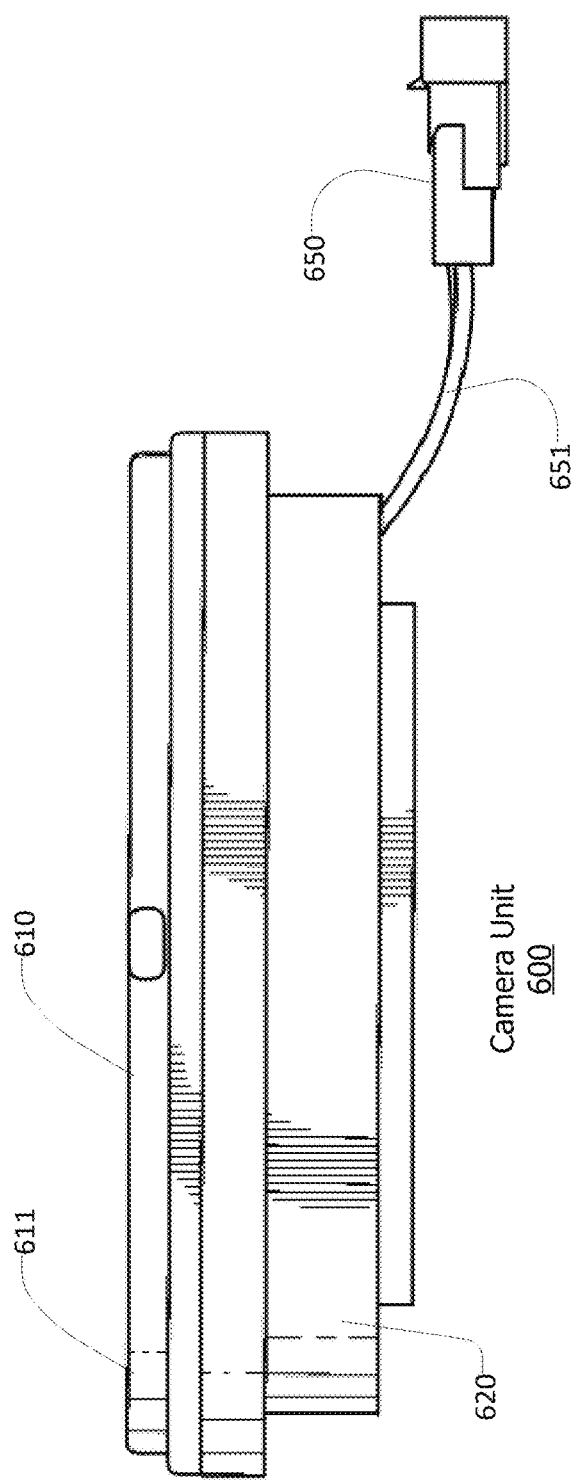
FIG. 6 is an isometric perspective view of an alternative tail light camera unit.

Referring now to FIG. 6 there is shown an isometric perspective view of an alternative tail light camera unit 600 which may be the camera unit 100 having the same components. (For ease of reference, elements in FIG. 6 are assigned reference numbers in the 600s with the tens and ones digits the same as the corresponding elements in FIG. 2 and FIG. 4). The camera unit 700 is the same as the camera unit 400, except that the connector 650 is on a cable 651 extending from the housing 620, whereas the camera unit 400 has a connector 450 attached to the housing 420. The camera unit 600 may be adapted as a license plate frame light, providing downward lighting to a license plate and an outward field of view of the camera.

Figure 7:
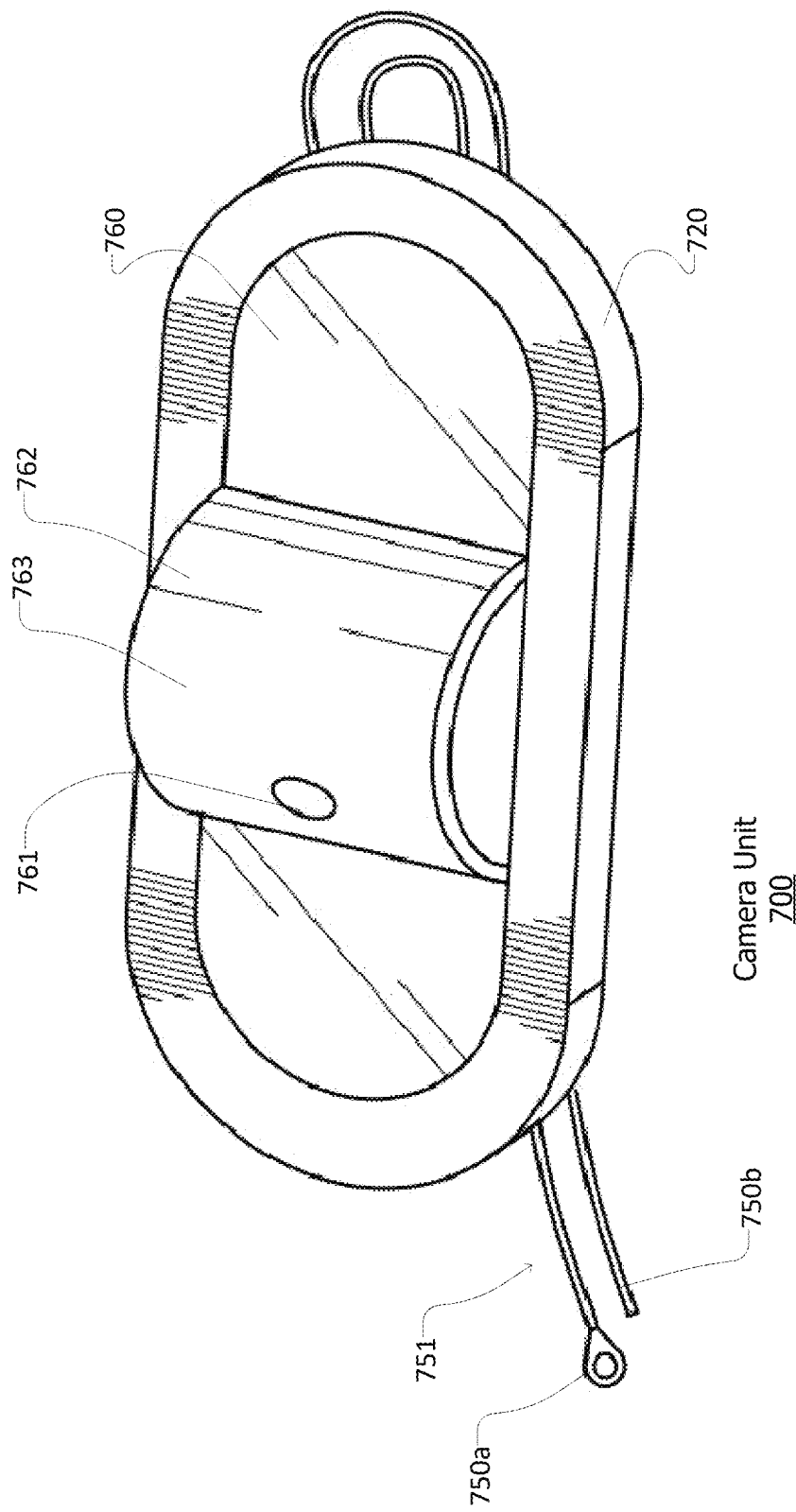
FIG. 7 is an isometric perspective view of a side light camera unit.

Referring now to FIG. 7 there is shown an isometric perspective view of a side light camera unit 700 which may be the camera unit 100 having the same components. (For ease of reference, elements in FIG. 7 are assigned reference numbers in the 700s with the tens and ones digits the same as the corresponding elements in FIG. 2 and FIG. 4). The mounting bracket (not shown) on housing 420 may have an ordinary form factors that is typical for such a trailer light. The camera units 700a, 700b, 700c (FIG. 1) may be the same as the camera unit 700. The housing 720 has an oval cross-section, 6½" wide×2¼" tall×2¾" deep. The cover 760 is oval. To emit yellow or amber light, the cover 760 is colored amber or yellow for white light from the lamp, or clear from a colored lamp. The cover 720 has a convex central portion 763. The clear portion 761 is in the convex central portion 763 and offset from center to provide a directional field of view. This field of view may be forward of the camera unit's location, such as along a side of the trailer or into a blind spot of the driver.

The camera unit 700 has power leads 751 extending through the housing 760 which terminate at a grounding connector 750a and a loose end 750b. This arrangement is suited to trailer locations without leads but no connector. The size of the lamp cover can be 6" oval (6" across the longer length of the oval) and the camera can be ¾" diameter round or smaller as in 400 cover.

The camera unit 700 may use a combination of the vertical positions and surface area of the clear portion 761 and the image sensor of the camera, and filters as explained with respect to the camera unit 400, to ensure useful images from the image sensor are obtained despite the lamp 410 being illuminated.

Figure 8:
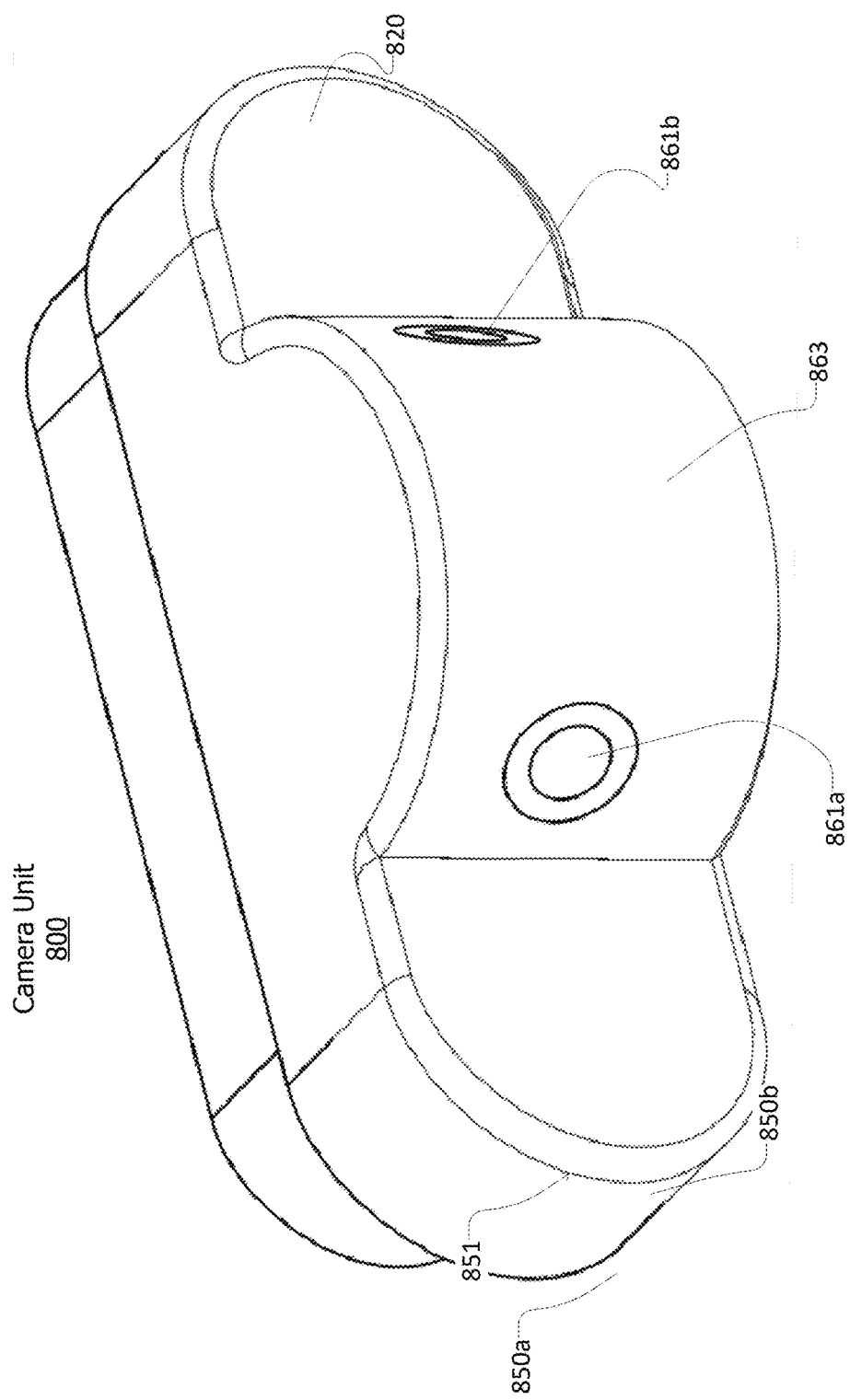
FIG. 8 is a perspective view of a dual-camera side light camera unit.

Referring now to FIG. 8 there is shown a perspective view of a dual-camera side light camera unit 800 which may be the camera unit 100 having the same components. (For ease of reference, elements in FIG. 8 are assigned reference numbers in the 800s with the tens and ones digits the same as the corresponding elements in FIG. 2 and FIG. 4). The camera unit 800 is the same as the camera unit 700, except that the camera unit 800 has two cameras. Like the camera unit 700, the cover 820 of the camera unit 800 has a convex central portion 863. There are two covers 861a, 861b in the convex central portion 863 and offset from center to provide opposing fields of view. Internally, the two cameras are mounted behind the respective covers 831a, 831b, with power and data connections as with the single-camera units. The dual cameras may be separate units or may be integrated together, with either one or two connections to the PLC interface.

The use of two cameras increases the FOV to approximately double that of a single camera. In the camera unit 800, one camera has a forward a FOV the other a backward FOV. Thus, the FOVs may image a scene to the side of and immediately adjacent to the trailer 10, such as beside the trailer 10, beyond the front end of the trailer 10 and beyond the back end of the trailer 10. The FOVs of the cameras may overlap. Images from the two cameras that overlap may be stitched together by the camera unit 800 and/or transmitted separately.

Figure 9:
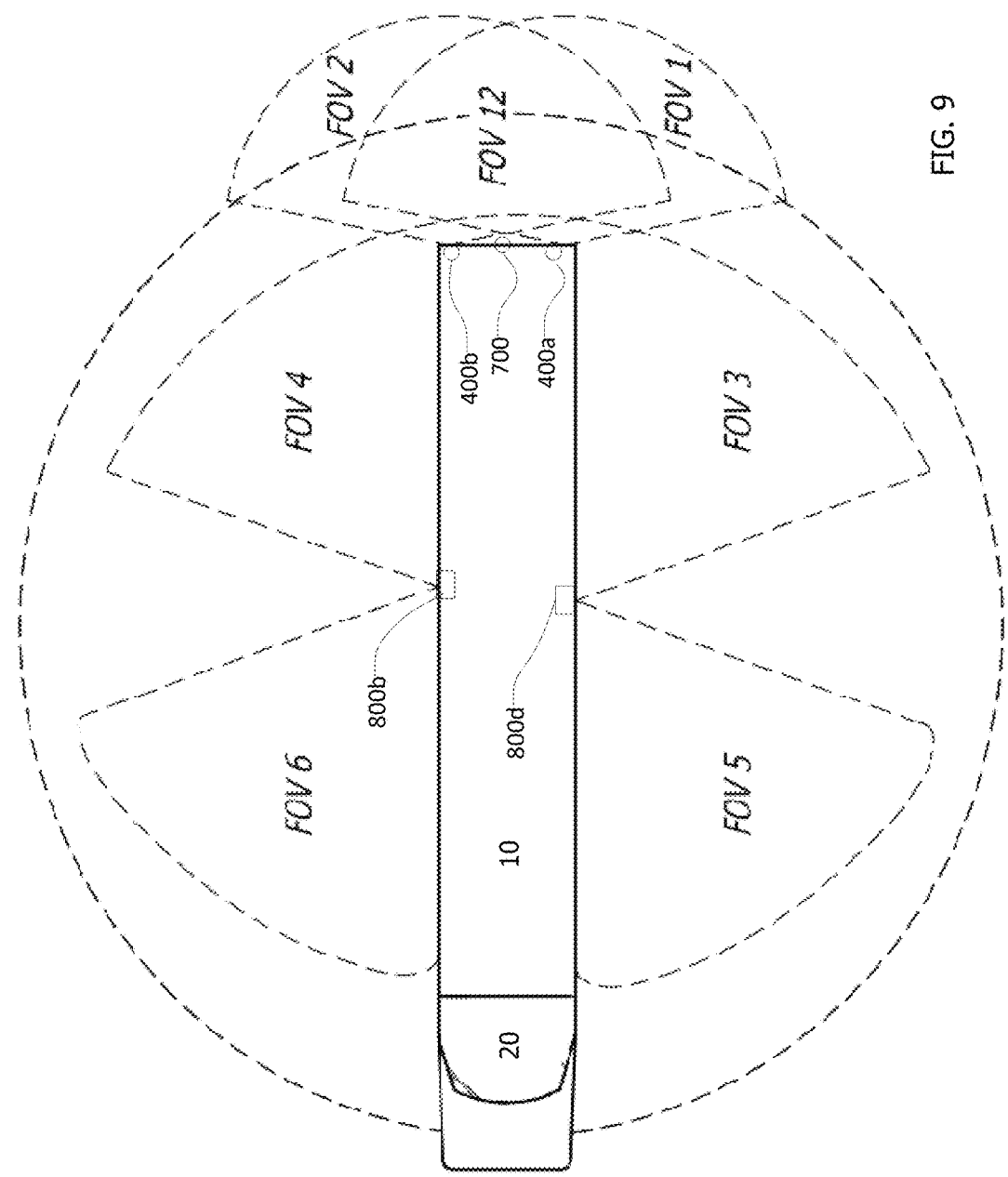
FIG. 9 is a top view of fields of view of the video system installed in the tractor and the attached box trailer.

Referring now to FIG. 9 there is shown a top view of camera units and their respective fields of view: rear light camera unit 400a—FOV 1, rear light camera unit 400b—FOV 2, dual side light camera unit 800d—FOV 3 and FOV 5, dual side light camera unit 800b—FOV 4 and FOV 6, and license plate frame camera unit 700—FOV 12. The FOV 3 and FOV 5 may overlap at least in the direction outwards for unit 800d in order to eliminate the blind area there if they did not overlap. The FOV 4 and FOV 6 may also overlap at least in the direction outwards for unit 800b in order to eliminate the blind area there if they did not overlap. The overlap may be a larger angle than just that direction and may be stitched together to show a single FOV having the overlapped FOVs. Images of these FOVs may be shown alone or in combination on the user interface device 210 in the cab 21. The user interface device 210 may provide displays to the user and accept user inputs which allow the user to select which of the fields of view to display. The display unit 200 may stitch together one or more of the fields of view, and may provide a birds-eye view based upon a collection of stitched fields of view. The display unit 200 may automatically display certain fields of view or images from the camera units, such as a rear view when the tractor 20 is in a reverse gear.

Besides cameras, other data-generating devices could be included in the camera unit such as a proximity sensor (to detect people and objects, lane change assistance), odor detector (e.g., to detect smoking tire or brakes), IR/heat sensor (for imaging or object detection), global positioning satellite (GPS) tracker, sensors to detect open doors, wet or dry temperature sensors to detect the temperature inside of a tanker or cargo container. Other sensors that could be included in the camera unit include a millimeter radar sensor and/or an ultra-sonic sensors.

Figure 10:
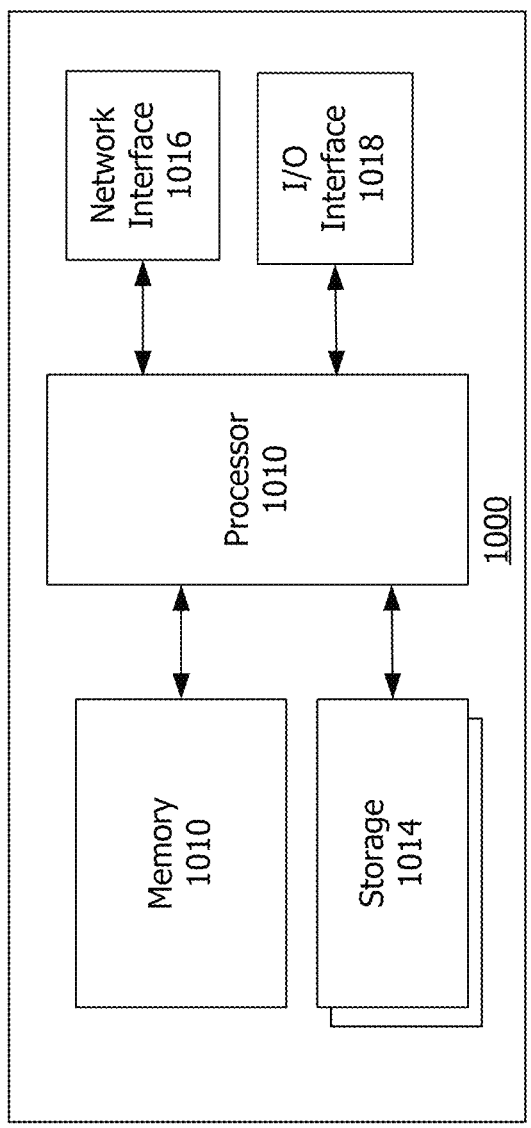
FIG. 10 is a block diagram of a computing device.

Referring now to FIG. 10 there is shown a block diagram of a computing device 1000. The computing device 1000 is representative of the various controllers of the video system. Thus the computing device 1000 may be or be part of the camera unit 100, camera 130, display unit 200, PLC interfaces 140, 240, user interface device 210 or controller 230. The computing device 1000 includes software and/or hardware for providing corresponding functionality and features described herein. These computing devices may run an operating system, including variations of the Linux, Microsoft Windows, and Apple operating systems. The techniques may be implemented with machine readable storage media in a storage device included with or otherwise coupled or attached to a computing device.

The computing device 1000 may include one or more of logic arrays, memories, analog circuits, digital circuits, software, firmware and processors. The hardware and firmware components of the computing device 1000 may include various specialized units, circuits, software and interfaces for providing the functionality and features described herein. For example, device 1000 may perform control and processing of a video system for tractor-trailers, software thereof or method for operation thereof as noted herein. This includes converting video data to PLC video data; and vice versa as noted herein.

The computing device 1000 has a processor 1010 coupled to a memory 1010, storage 1014, a network interface 1016 and an I/O interface 1018. The processor 1010 may be or include one or more microprocessors, field programmable gate arrays (FPGAs), application specific integrated circuits (ASICs), programmable logic devices (PLDs) and programmable logic arrays (PLAs). The memory 1010 may be or include RAM, ROM, DRAM, SRAM and MRAM, and may include firmware, such as static data or fixed instructions, BIOS, system functions, configuration data, and other routines used during the operation of the computing device 1000 and processor 1010. The memory 1010 also provides a storage area for data and instructions associated with applications and data handled by the processor 1010, such as data and instructions associated with the control and processing of an AVI system or method herein. As used herein the term "memory" corresponds to the memory 1010 and explicitly excludes transitory media such as signals or waveforms.

The storage 1014 provides non-volatile, bulk or long-term storage of data or instructions in the computing device 1000, such as data and instructions associated with the control and processing of a video system for tractor-trailers, software thereof or method for operation thereof as noted herein. The storage 1014 may take the form of a magnetic or solid state disk, tape, CD, DVD, or other reasonably high capacity addressable or serial storage medium. Multiple storage devices may be provided or available to the computing device 1000. Some of these storage devices may be external to the computing device 1000, such as network storage or cloud-based storage. As used herein, the terms "storage" and "storage medium" correspond to the storage 514 and explicitly exclude transitory media such as signals or waveforms. such as those involving solid state memory devices, the memory 1010 and storage 1014 may be a single device. The memory 1010 and/or storage 1014 can include an operating system executing the data and instructions associated with the control and processing of a video system for tractor-trailers, software thereof or method for operation thereof as noted herein.

The network interface 1016 includes an interface to a network such as a network that can be used to communicate network packets, network messages, telephone calls, faxes, signals, streams, arrays, and data and instructions associated with the control and processing of a video system for tractor-trailers, software thereof or method for operation thereof as noted herein. The network interface 1016 may be wired and/or wireless. The network interface 1016 may be or include Ethernet capability. The network interface 1016 may be a transmitter or receiver of PLC video data.

The I/O interface 1018 interfaces the processor 1010 to peripherals (not shown) such as displays, video and still cameras, microphones, user input devices (for example, touchscreens, mice, keyboards and the like). The I/O interface 1018 interface may support USB, Bluetooth and other peripheral connection technology. The I/O interface 1018 includes the peripherals, such as displays and user input devices, for user accessed to data and instructions associated with the control and processing of a video system for tractor-trailers, software thereof or method for operation thereof as noted herein.

The storage 1014 is a non-volatile machine-readable storage medium that includes computer readable media, including magnetic storage media, optical storage media, and solid state storage media. It should be understood that the software can be installed in and sold with a video system for tractor-trailers, software thereof or method for operation thereof as noted herein and/or the other published content or components of a video system for tractor-trailers, software thereof or method for operation thereof as noted herein. Alternatively, the software can be obtained and loaded into the data and instructions associated with the video system for tractor-trailers, software thereof or method for operation thereof as noted herein, including obtaining the software via a disc medium or from any manner of network or distribution system, including from a server owned by the software creator or not owned but used by the software creator. The software can be stored on a server for distribution locally via a LAN and/or WAN, and/or to another location via a WAN and/or over the Internet.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A trailer light comprising:
    a housing defining a cavity and adapted to mount to a trailer;
    a cover attached to the housing and covering the cavity, the cover having a translucent portion and a clear portion;
    first leads extending from outside of the housing into the cavity;
    a power-line carrier (PLC) interface disposed within the housing and adapted to bridge between second leads over which data and power are multiplexed, to third leads carrying DC power only and fourth leads carrying data only, wherein the second leads are electrically connected to the first leads;
    a lamp mounted within the cavity of the housing, wherein the lamp is connected and adapted to draw power from the first leads over which data and power are multiplexed, and when powered to emit light through the translucent portion of the cover; and
    a camera mounted within the cavity having a field of view through the clear portion of the cover, and wherein the camera is connected and adapted to draw power through the third leads, connected and adapted to exchange data through the fourth leads, and when powered to capture images and transmit the images as data to the PLC interface.

2. The trailer light of claim 1 wherein the first leads terminate outside of the housing in an electrical connector.

3. The trailer light of claim 1 wherein the camera comprises two image sensors having overlapping fields of view.

4. The trailer light of claim 1 wherein the PLC interface uses orthogonal frequency-division multiplexing to encode the data from the camera.

5. The trailer light of claim 1 wherein the translucent portion of the cover is a color filter adapted to filter light from the lamp to amber, yellow or red.

6. The trailer light of claim 1 wherein the translucent portion of the cover is clear and the lamp emits either amber, yellow or red light.

7. The trailer light of claim 1 wherein the camera has a lens that looks through the clear portion of the cover.

8. The trailer light of claim 1 wherein the clear portion of the cover is a lens.

9. The trailer light of claim 1 wherein the PLC interface includes:
    a modulator connected to the fourth leads and adds the digital data from the camera onto a modulated carrier signal; and
    a transmitter connected to the modulator and the third leads, for transmitting the modulated data through the third leads for transmission onto the first leads.

10. The trailer light of claim 1 wherein the clear portion has a surface area less than ten percent of a surface area of the translucent portion.

11. A trailer light comprising:
a cover sized and configured to fit a rear brake or a turn light of a trailer, the cover having semitransparent portion and a transparent region;
an array of LEDs disposed so that light from the LEDs is transmitted through the cover and projects a red or a yellow light through the semitransparent portion when the LEDs emit light;
a camera having an image sensor having a clear field of view through the transparent portion of the cover; and
a three-pin connector in electrical communication with the camera and the LEDs and connectable to a corresponding three-pin connector of the trailer, a first pin electrically connectable to a tail light pin;
wherein the LEDs are directly connected to power so a light function of the LEDs is independent of a camera function of the camera.

12. The trailer light of claim 11 further comprising a rechargeable battery mounted in the cavity and electrically disposed between the first pin of the three-pin connector and the camera, the rechargeable battery further connected to a second pin of the three-pin connector connectable to a brake light pin, wherein the rechargeable battery is recharged via the first pin when a tail light is turned on and recharged via the second pin when a brake light is turned on.

13. The trailer light of claim 11 wherein the cover is sized and configured to fit a 4" diameter rubber mounting grommet or a metallic or rigid mounting ring of a rear brake light positioned on the back right of a vehicle to provide a good view for the driver.

14. The trailer light of claim 11 wherein the cover has a 4" round or a 6" oval cross-section.

15. The trailer light of claim 14 wherein the cover has a lens with a 4" round or a 6" oval cross-section and the lens is a Fresnel lens.

16. The trailer light of claim 15 wherein the image sensor has a ¾" diameter round cover.

17. The trailer light of claim 16 wherein image sensor sticks out of an outside-facing surface of the cover in order to avoid light contamination.

18. The trailer light of claim 16 wherein image sensor is encircled by a colored plastic collar to avoid light contamination.

19. The trailer light of claim 11 wherein the camera comprises two image sensors having overlapping fields of view.

* * * * *